United States Patent
Reichert et al.

(10) Patent No.: US 7,291,655 B2
(45) Date of Patent: Nov. 6, 2007

(54) POLYMERISATION METHOD AND DEVICE FOR CARRYING OUT A POLYMERISATION METHOD

(75) Inventors: Karl-Heinz Reichert, Berlin (DE); Annette Wittebrock, Berlin (DE); Kalle Kallio, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/479,384

(22) PCT Filed: May 29, 2002

(86) PCT No.: PCT/EP02/05932

§ 371 (c)(1),
(2), (4) Date: Apr. 30, 2004

(87) PCT Pub. No.: WO03/011919

PCT Pub. Date: Feb. 13, 2003

(65) Prior Publication Data

US 2004/0192866 A1    Sep. 30, 2004

(30) Foreign Application Priority Data

Jun. 1, 2001 (DE) ............... 101 26 829
Jul. 27, 2001 (DE) ............... 101 36 683
Jul. 27, 2001 (DE) ............... 101 36 684
Jul. 27, 2001 (DE) ............... 101 36 687
Jan. 11, 2002 (DE) ............... 102 00 740

(51) Int. Cl.
*C08F 2/46* (2006.01)
*C08F 2/50* (2006.01)

(52) U.S. Cl. ............... 522/29; 522/66; 522/184; 522/186; 522/189; 522/185; 522/187; 522/912; 522/915; 522/84; 522/86

(58) Field of Classification Search ............... 522/66, 522/29, 173, 174, 175, 177, 178, 181, 182, 522/179, 184, 185, 186, 189, 912, 915, 84, 522/86
See application file for complete search history.

(56) References Cited

U.S. PATENT DOCUMENTS

| 4,069,124 | A | * | 1/1978 | Marek et al. | ............... 522/5 |
| 5,461,123 | A | * | 10/1995 | Song et al. | ............... 526/74 |
| 5,877,230 | A | * | 3/1999 | Kutal | ............... 522/66 |
| 5,922,783 | A | * | 7/1999 | Wojciak | ............... 522/18 |

* cited by examiner

*Primary Examiner*—Sanza L. McClendon
(74) *Attorney, Agent, or Firm*—Fay Sharpe LLP

(57) ABSTRACT

A polymerization process with elevated productivity using a coordination catalyst, wherein electromagnetic radiation is applied during polymerization. The irradiation of light greatly increases the activity of the coordination catalyst.

37 Claims, 1 Drawing Sheet

POLYMERISATION METHOD AND DEVICE FOR CARRYING OUT A POLYMERISATION METHOD

Figure 1:
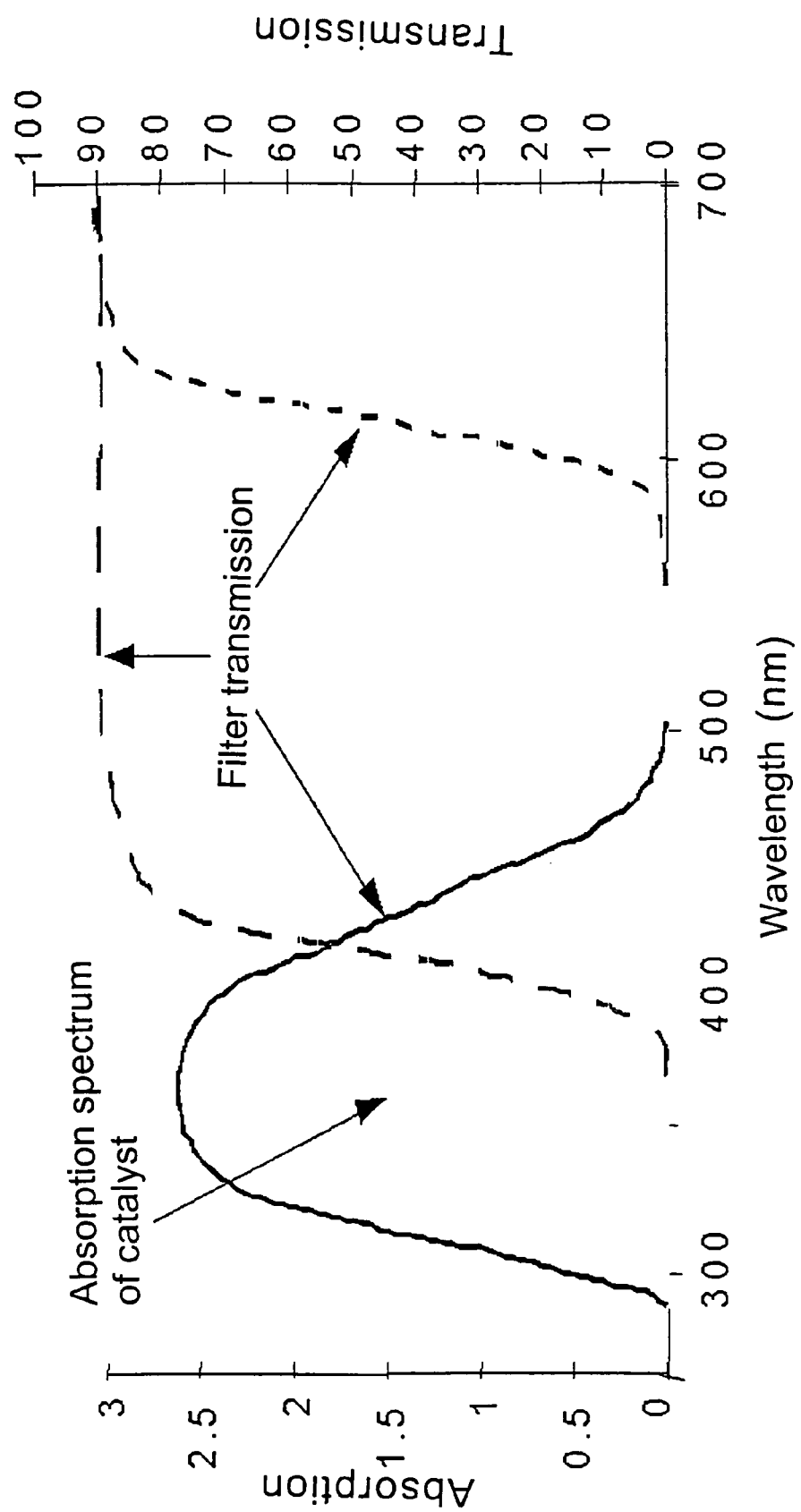

This invention relates to a polymerization process, in particular a process for increasing the productivity of the polymerization process, and to the polymers produced by said process and to apparatuses for carrying out said polymerization process.

In polymerization one distinguishes between free-radical polymerization and coordination polymerization using coordination catalysts. The coordination catalysts, e.g. metallocene catalysts, are customarily used together with a cocatalyst, such as alumoxane, since the catalytic activity of the coordination catalysts is often insufficient. New coordination catalysts are being developed that have higher activity, permitting the addition of cocatalysts to be avoided or at least reduced.

A further disadvantage of coordination polymerization is that the coordination catalysts are very sensitive to impurities, which can lead to a considerable reduction or even inactivation of the catalytic activity.

There is therefore a need to improve the catalytic activity of coordination catalysts in coordination polymerization.

The invention is based on the problem of providing a coordination polymerization process characterized by especially high activity of the coordination catalyst and thus high productivity.

The invention is based on the finding that this problem can be solved by supplying electromagnetic radiation during coordination polymerization.

It has surprisingly turned out that in coordination polymerization, i.e. polymerization not taking place according to a free-radical process, the use of electromagnetic radiation can obtain an increase in the activity of the catalyst or an increase in the productivity of the process. Further advantages are that the quantity of cocatalyst added to increase catalyst activity can be reduced or no cocatalyst need be added. A further advantage is that "weak" coordination catalysts can be used which radiation can activate to a useful activity level.

The subject matter of the invention is a polymerization process using a coordination catalyst wherein the coordination catalyst and/or the monomer is exposed to electromagnetic radiation during the coordination polymerization process.

The subject matter of the invention is further a process for increasing the productivity of a coordination catalyst in a polymerization process wherein the coordination catalyst and the monomer tire exposed to electromagnetic radiation during the polymerization process.

The subject matter of the invention is further a polymer produced by a coordination polymerization process using a coordination catalyst wherein the coordination catalyst and the monomer are exposed to electromagnetic radiation during the polymerization reaction.

The subject matter of the invention is finally an apparatus for a polymerization process comprising devices for emitting electromagnetic radiation, the radiation being directed to the coordination catalyst and the monomer.

Coordination polymerization is polymerization by which catalysts, such as Ziegler-Natta catalysts or metallocene catalysts, initiate polymerization, the newly entering monomers being inserted between growing polymer chains and transition metal of the catalyst complex. For the definition of coordination polymerization, express reference is made to Römpp,. Lexikon der Chemie, 10th ed., page 2246, and George Odian, "Principles of Polymerization," 2nd Edition, John Wiley & Sons, U.S.A., 1981. Coordination polymerization also refers to coordination polymerization in which coordinations take place, as defined above, but can involve ionic intermediate stages.

The polymerization reaction of the present invention takes place without formation of free radicals. Further, it is possible for impurities, which can usually be contained in the raw materials, to be present in the polymerization process.

Coordination catalysts refer to all catalysts that can be used in coordination polymerization, in particular transition metal compounds such as Ziegler-Natta catalysts, metallocenes, so-called late transition metal catalysts and chromium catalysts, nickel catalysts, vanadium catalysts and Phillips catalysts.

Suitable Ziegler-Natta catalysts are for example ones containing a compound of a transition element of groups 4 to 6 of the periodic system of elements (IUPAC Nomenclature of Inorganic Chemistry, 1989) as a procatalyst and a compound of a metal of groups 1 to 3 of the periodic system of elements as a cocatalyst. Preferably, they are applied on a support, such as silicon dioxide. They can also contain other additives, such as electron donors. Ziegler-Natta catalysts are described for example in EP-A-0 261 130, the disclosure of which is incorporated herein by reference. Further examples of Ziegler-Natta catalysts are described in EP-A-0 688 794, FI-A-974622, FI-A-86866, FI-A-96615, FI-A-88047 and FI-A-88048.

A subgroup of transition metal compounds is formed by organotransition metal compounds having formula I:

$$(L)_m R_n MX_q \qquad (I)$$

where M is a transition metal of group 3 to 10, for example 3 to 7, such as 4 to 6, and each X is independently a monovalent anionic ligand, such as a σ ligand, each L is independently an organic ligand coordinating to M, R is a bridging group connecting two ligands L, m is 1, 2 or 3, n is 0 or 1, q is 1, 2 or 3, and m+q equals the valence of the metal.

A "σ ligand" refers to a group bound to the metal via a sigma bond at one or more places.

According to a preferred embodiment, said organotransition metal compounds I are a group of compounds known as metallocenes. Said metallocenes carry at least one organic ligand, generally 1, 2 or 3, for example 1 or 2, which is η-bound to the metal, for example an $\eta^{2-6}$ ligand, such as an $\eta^5$ ligand. Preferably the metallocene contains a transition metal from groups 4 to 6, and is suitably a titanocene, zirconocene or hafnocene containing at least one $\eta^5$ ligand, which is for example an optionally substituted cyclopentadienyl, an optionally substituted indenyl, an optionally substituted tetrahydroindenyl or an optionally substituted fluorenyl.

The metallocene compound can have the following formula II:

 (II)

each Cp is independently an unsubstituted or substituted and/or fused homo- or hetero-cyclopentadienyl ligand, for example a substituted or unsubstituted cyclopentadienyl ligand, substituted or unsubstituted indenyl ligand or substituted or unsubstituted fluorenyl ligand; the optional one or more substituents are preferably selected from halogen, hydrocarbon residue (e.g. C1-C20 alkyl, C2-C20 alkenyl, C2-C20 alkynyl, C3-C12 cycloalkyl, C6-C20 aryl or C7-C20 arylalkyl), C3-C12 cycloalkyl containing 1, 2, 3 or 4 heteroatoms in the ring component, C6-C20 heteroaryl, C1-C20 haloalkyl, $-SiR''_3$, $-OSiR''_3$, $-SR''$, $-PR''_2$ or $-NR''_2$, where each R'' is independently a hydrogen or hydrocarbon residue, e.g. C1-C20 alkyl, C2-C20 alkenyl, C2-C20 alkynyl, C3-C12 cycloalkyl, C6-C20 aryl; or e.g. in the case of $-NR''_2$ the two substituents R'' can form a ring, e.g. a five- or six-membered ring, together with the nitrogen atom to which they are bound; R is a bridge of 1 to 7 atoms, e.g. a bridge of 1-4 C atoms and 0-4 heteroatoms, in which the heteroatom or heteroatoms can be for example Si, Ge and/or O atoms, whereby each of the bridge atoms can independently carry substituents, such as C1-C20 alkyl, tri(C1-C20 alkyl)silyl, tri(C1-C20 alkyl)siloxy or C6-C20 aryl substituents; or a bridge of 1-3, e.g. one or two, heteroatoms, such as silicon, germanium and/or oxygen atoms, e.g. $-SiR^1_2$, where each $R^1$ can independently be a C1-C20 alkyl, C6-C20 aryl or tri(C1-C20 alkyl)silyl residue, such as trimethylsilyl;

M is a transition metal of groups 4 to 6, such as group 4, e.g. Ti, Zr or Hf, each X is independently a sigma ligand, such as H, halogen, C1-C20 alkyl, C1-C20 alkoxy, C2-C20 alkenyl, C2-C20 alkynyl, C3-C12 cycloalkyl, C6-C20 aryl, C6-C20 aryloxy, C7-C20 arylalkyl, C7-C20 arylalkenyl, $-SR''$, $-PR''_2$, $-SiR''_3$, $-OSiR''_3$, or $-NR''_2$, where each R'' is defined like X above, and is preferably independently hydrogen or a hydrocarbon residue, e.g. C1-C20 alkyl, C2-C20 alkenyl, C2-C20 alkynyl, C3-C12 cycloalkyl or C6-C20 aryl; or e.g. in the case of $-NR''_2$ the two substituents R'' can form a ring, e.g. a five- or six-membered ring, together with the nitrogen atom to which they are bound;

and each of the abovementioned rings alone or as a part of a residue as a substituent for Cp, X, R'' or $R^1$ can further be substituted e.g. with C1-C20 alkyl containing Si and/or O atoms;

n is 0, 1 or 2, preferably 0 or 1, m is 1, 2 or 3, e.g. 1 or 2, q is 1, 2or 3, e.g. 2or 3, m+q equals the valence of M.

Said metallocenes II and their preparation are known from the prior art.

Metallocenes are extensively described in EP 0 260 130, the disclosure of which is incorporated herein by reference. Further literature to which reference is made for metallocenes is the following: WO 97/28170, WO 98/46616, WO 98/49208, WO 99/12981, WO 99/19335, WO 98/56831, WO 00/34341, EP-A-0 423 101 and EP-A-0 537 130 and "Metallocenes," vol. 1, Togni and Halterman (Eds.), Wiley-VCH 1998, and V. C. Gibson et al., in Angew. Chem. Int. Ed., Engl., vol. 38, 1999, pages 428-447, EP 576 970, EP 485 823, EP 785 821, EP 702 303.

Alternatively, in a further subgroup of metallocene compounds the metal carries a Cp group as defined above and additionally an $\eta^1$ or $\eta^2$ ligand, wherein said ligands may or may not be bridged with each other. Said subgroup includes so-called "scorpionate compounds" (with forced geometry) in which the metal is complexed by an $\eta^5$ ligand that is bridged with an $\eta^1$ or $\eta^2$ ligand, preferably with an $\eta^1$ ligand (e.g. a σ-bound one), e.g. a metal complex of a Cp group as defined above, e.g. a cyclopentadienyl group carrying via a bridging link an acyclic or cyclic group containing at least one heteroatom, e.g. $-NR''_2$ as defined above. Such compounds are described for example in WO-A-9613529, the content of which is incorporated herein by reference.

A further subgroup of organotransition metal compounds with formula I that can be used in the present invention is known as "non-metallocenes," wherein the transition metal (preferably a transition metal of groups 4 to 6, suitably Ti, Zr or Hf) has a coordination ligand other than the $\eta^5$ ligand (i.e. other than a cyclopentadienyl ligand). Examples of such compounds are transition metal complexes with nitrogen-based, cyclic or acyclic aliphatic or aromatic ligands, e.g. like those in the earlier application WO-A-9910353 or in the synoptic article by V. C. Gibson et al., Angew. Chem. Int. Ed., Engl., vol. 38, 1999, 428-447, or with oxygen-based ligands, such as group 4 metal complexes carrying bidentate cyclic or acyclic aliphatic or aromatic alkoxide ligands, e.g. optionally substituted, bridged bisphenolic ligands (cf. abovementioned synoptic article by Gibson et al.). Further specific examples of non-$\eta^5$ ligands are amido, amide diphosphane, amidinate, aminopyridine, benzamidinate, triazacyclononane, allyl, hydrocarbon, beta-diketimate and alkoxide.

Further suitable catalysts are chromium catalysts such as chromium oxide on silicon dioxide, chromocenes and in particular the catalysts described in EP-A-0 480 276, EP-A-0 533 156, EP-A-0 533 160, EP-A-0 100 879 and U.S. Pat. No. 4,011,382, the disclosure of which is incorporated herein by reference; and nickel catalysts, in particular those described in WO 99/62968, WO 98/47933, WO 98/40420, W098/47933, WO 00/06620 and WO 96/23010, the disclosure of which is incorporated herein by reference, and vanadium catalysts.

Further, Phillips catalysts are very suitable.

It is also possible to use different coordination catalysts together, so-called dual- or multi-catalytic systems. These can consist of a combination of different ones of the aforementioned catalysts, e.g. a combination of two or more metallocenes, a metallocene and a non-metallocene, a Ziegler-Natta catalyst and a metallocene, or a Ziegler-Natta catalyst and a non-metallocene.

Preferably, the coordination catalysts include one or more cocatalysts, e.g. an organic aluminum compound such as trialkylaluminum and/or alumoxane compounds. Boron coactivators are also especially suitable.

Both homogeneous and heterogeneous catalyst systems can be used. In a heterogeneous catalyst system the coordination catalyst component, optionally together with the cocatalyst, is preferably applied on an inert support, such as silicon dioxide. The porous, particulate support is usually impregnated with the catalyst system. In this connection, reference is made to EP 678103 and PCT/GB01/01280.

The coordination catalysts used do not decompose through the activation with electromagnetic radiation.

Monomers to be used for the inventive process are in particular olefins. Any olefin that can be polymerized by coordination polymerization is suitable.

Preferred olefins are ethylene and propylene and mixtures of ethylene and propylene with one or more α-olefins. Suitable comonomers are $C_{2-12}$ olefins, preferably $C_{4-10}$ olefins, such as 1-butene, isobutene, 1-pentene, 1-hexene, 4-methyl-1-pentene, 1-heptene, 1-octene, 1-nonene, 1-decene, and dienes such as butadiene, 1,7-octadiene and 1,4-hexadiene or cyclic olefins such as norbornene, and mixtures thereof. The quantity of comonomer is generally 0.01 to 50 wt %, preferably 0.1 to 10 wt % and in particular 0.3 to 3 wt %.

The inventive process is also suitable for polymerizing long-chain α-olefins with 4 to 40 carbon atoms that can be polymerized either alone or in combination, also with short-chain α-olefins. Suitable examples are: 1-butenes, 1-pentene, 1-hexenes, 1-heptene, 1-octene, 1-nonene, 1-decene, 1-undecene, 1-dodecene. 1-tridecene, 1-tetradecene, 1-pentadecene, 1-hexadecene, 1-heptodecene, 1-octodecene, 1-nonadecene, 1-eicosene, etc., to tetradecene. It is preferred to use α-olefins with 4 to 16 carbon atoms. Further suitable monomers are isomers of α-olefins with branched alkyl groups, such as 4-methyl-1-pentene.

Further suitable monomers are vinyl monomers such as alkyl and aryl vinyl monomers, e.g. styrene, vinyl ether, vinyl ester, acrylic acid and its ester, methacrylic acid and its ester, acrylamide, acrylonitrile, vinyl amines, and the like.

The coordination polymerization according to the invention can be performed in one or more polymerization reactors. Conventional polymerization techniques are applicable, such as gas phase polymerization, solution polymerization, slurry polymerization, bulk polymerization, emulsion polymerization and precipitation polymerization. Different polymerization processes can be combined. It is especially suitable to combine slurry polymerization followed by gas phase polymerization.

The polymerization processes can be performed continuously or batchwise.

The inventive process is also particularly suitable for prepolymerization, which is followed by the actual polymerization.

The inventive process is also suitable for oligomerization. That is, oligomerization is included in the term "polymerization" here.

The polymerization process is performed in the presence of electromagnetic radiation. Electromagnetic radiation is additional radiation to natural radiation or to artificial room lighting.

The increase in activity of the catalyst system or the increase in productivity of the polymerization process is dependent on the intensity of the radiation. The higher the intensity, the higher the activity.

Irradiation can be effected continuously, but also in intervals or in pulsed fashion or only for a short time at the onset of the polymerization.

In the inventive process, radiations of different wavelengths can be used. The wavelength can be in any wavelength range of the electromagnetic spectrum, which extends from gamma radiation to radio waves. Suitable waves are in particular ones in the range between x-rays and microwaves, the range between UV and infrared being preferred and in particular short-wave visible light and UV light being especially suitable.

Expressed in wavelengths, the radiation can be in the range between $10^{-2}$ and $10^4$ meters. However, preferred radiation is between $10^{-8}$ and $10^{-2}$ meters, in particular $10^{-8}$ and $10^{-6}$ meters and particularly radiation in the range between 100 and 800 nanometers. The radiation can have a uniform wavelength or consist of radiation with different wavelengths.

Thus, it turned out in the enclosed examples that blue light is especially favorable for effective polymerization for the catalysts used therein, i.e. a wavelength range of 300 to 480 nanometers for said example.

According to an especially preferred embodiment, the electromagnetic radiation used has a wavelength in the range of the absorption spectrum of the coordination catalyst. Preferred radiation has a wavelength in the area of the peak of the absorption spectrum of the coordination catalyst.

For disposing the radiation source in the polymerization system there are in principle two possibilities. In one case, and this is preferred, the radiation source is disposed inside the polymerization reactor, optionally also in the feed pipe to the reactor. Alternatively, the radiation source can be disposed outside the reactor. The reactor is then provided with a window that is transparent to the particular radiation. Preferably, the window is made of glass or quartz. A window can be omitted if the radiation can penetrate through the wall of the reactor.

Further, it is also possible that an apparatus for emitting electromagnetic radiation is disposed outside the polymerization reactor or the feed pipe to the polymerization reactor, and the. electromagnetic radiation can pass into the reactor via a light guide.

The quantity of radiation is dependent on the size of the reactor system.

In a combined polymerization process, such as slurry polymerization, which is preferably performed in a loop reactor, and a subsequent gas phase reactor, the radiation can be introduced at one or more places of the loop system. The gas phase reactor can also be exposed to radiation. Alternatively, the feed pipes to the reactors can be irradiated, optionally in addition to the reactors.

A suitable polymerization system is for example the following. The first reactor is a slurry reactor. It works at a temperature in the range of 60 to 110° C. The reactor pressure is in the range of 0.1 to 100 bars, preferably 5 to 80 bars and in particular 50 to 65 bars. The residence time is 0.1 to 5 hours, preferably 0.3 to 5 hours and in particular 0.5 to 2 hours. The diluent used is generally an aliphatic hydrocarbon. Polymerization can be performed under supercritical conditions. Subsequently one or more gas phase reactors are connected. The reaction temperature is generally 60 to 115° C., preferably 70 to 110° C. The reactor pressure is 10 to 25 bars and the residence time 1 to 8 hours. The gas used is generally a nonreactive gas such as nitrogen.

The reactor system described by way of example is particularly suitable for polymerizing ethylene and propylene, or copolymerizing ethylene and propylene with α-olefins.

Suitable devices for emitting electromagnetic radiation are for example fluorescent lamps, incandescent lamps and halogen lamps. The quantity of radiation in the UV or visible range should be at least one watt per 100 milliliters of reaction volume.

The invention will be described in more detail in the following with reference to examples showing preferred embodiments.

EXAMPLE 1

Catalyst Production

The catalyst was produced by dissolving 11 mg of n-Bu-Cp$_2$ZrCl$_2$ (Witco GmbH, Germany) with MAO/toluene containing 1.15 ml of 30 wt % MAO (30 wt % MAO in toluene, from Albemarle) and 0.35 ml of moisture- and oxygen-free toluene. The metallocene/MAO/toluene solution was fed to a silicon dioxide support (SYLOPOL 55 SJ; Grace-Davison, calcined at 600° C. with a pore volume of 1.5 to 1.7 ml/g, surface 350 m$^2$/g) in such a way that the volume of the complex solution did not exceed the pore volume of the silicon dioxide (1.5 ml/g). Then drying was performed and drying terminated by passing moisture- and oxygen-free nitrogen through the catalyst at room temperature.

EXAMPLE 2

Catalyst Production

The catalyst was produced as described in Example 1 but the metallocene compound used was 14 mg of n-Bu-Cp$_2$ZrCl$_2$ (Witco GmbH, Germany).

EXAMPLE 3

Catalyst Production

The catalyst was produced as described in Example 1 but the metallocene compound used was 17.5 mg of rac-ethylene-bis(2-butyldimethylsiloxyindenyl) zirconium dichloride (produced according to WO 97 28170).

EXAMPLE 4

Polymerization with Full Light

Polymerization was performed in a 20 ml minireactor, with 7.08 mg of catalyst, produced according to Example 1, being introduced into the reactor. The reactor was closed and connected to the ethylene source. Ethylene partial pressure was set to 5 bars. Polymerization temperature was 80° C. and polymerization time 60 min. Ethylene consumption was pursued by the drop in pressure, namely in the range between 4980 and 5010 mbar. The reactor, provided with a glass window, was irradiated with a cold light source FLEXILUX 600 longlife with Phillips 14501 DDL, 20V/150 W halogen lamps. The highest light intensity was used. After a reaction time of 60 min polymerization was stopped by closing the ethylene supply and the ethylene pressure lifted. The polymer yield was 0.888488 g and the activity of the catalyst was 125.5 g HDPE/g catalyst per hour.

EXAMPLE 5

Polymerization without Light

Polymerization was performed as described in Example 4 but no light was irradiated. The quantity of catalyst was 6.95 mg. After 60 min of polymerization the polymer yield was 0.13806 g. The activity of the catalyst was 19.9 g HDPE/g cat h.

EXAMPLE 6

Polymerization with Half Light

Polymerization was performed as described in Example 4 but only half the light intensity was used. The quantity of catalyst was 6.96 mg. After 60 min of polymerization the polymer yield was 0.7831 g. The activity of the catalyst was 112.5 g HDPE/g cat h.

EXAMPLE 7

Polymerization with Light

Polymerization was performed as described in Example 4 but the catalyst according to Example 2 was used. The quantity of catalyst was 7.32 mg. After 60 min of polymerization the polymer yield was 0.56008 g. The activity of the catalyst was 76.5 g HDPE/g cat h.

EXAMPLE 8

Polymerization without Light

Polymerization was performed as in Example 7 but no light was used. The quantity of catalyst was 7.31 mg. After 60 min of polymerization the polymer yield was 0.10527 g. The activity of the catalyst was 14.4 g HDPE/g cat h.

EXAMPLE 9

Polymerization with Light

Polymerization was performed as described in Example 4 but the catalyst of Example 3 was used. The quantity of catalyst was 6.85 mg. After 60 min of polymerization the polymer yield was 0.74192 g. The activity of the catalyst was 108.3 g HDPE/g cat h.

EXAMPLE 10

Polymerization without Light

Polymerization was performed as described in Example 9 but no light was used. The quantity of catalyst was 7.24 mg. After 60 min of polymerization the polymer yield was 0.18847 g. The activity of the catalyst was 26.0 g HDPE/g cat h.

EXAMPLE 11

Polymerization with Blue Light

Polymerization was performed as described in Example 4 but using a blue filter transmitting at wavelengths in the range of 300 to 480 nm. The quantity of catalyst was 7.24 g. After 60 min of polymerization the polymer yield was 1.06657 g. The activity of the catalyst was 149.6 g HDPE/g cat h.

EXAMPLE 12

Polymerization with Green/yellow Light

Polymerization was performed as described in Example 4 but with a green/yellow filter transmitting at wavelengths over 400 nm. The quantity of catalyst was 7.1 mg. After 60 min of polymerization the polymer yield was 0.7225 g. The activity of the catalyst was 101.8 g HDPE/g cat h.

EXAMPLE 13

Polymerization with Red Light

Polymerization was performed as described in Example 4 but using a red filter transmitting at wavelengths over 600 nm. The quantity of catalyst was 6.93 mg. After 60 min of polymerization the polymer yield was 0.43305 g. The activity of the catalyst was 62.5 g HDPE/g cat h.

The examples show that the activity of the catalyst increases dramatically upon irradiation with light and that the activity depends on the intensity of radiation. The examples further show that the wavelength of the light influences the increase in activity.

EXAMPLE 14

Polymerization with a Ziegler-Natta Catalyst

All starting materials were substantially free of water and air and all additions of material to the reactor and in the various steps were performed under inert conditions in a nitrogen atmosphere. The water content in the propylene was lower than 5 ppm.

Polymerization was performed in a 5 l reactor which was heated, evacuated and flooded with nitrogen before it was used. 213 µl of TEA (triethylaluminum, from Witco, used without further purification/treatment), 36 µl of Donor D (dicyclopentyldimethoxysilane from Wacker, dried over molecular sieve) and 30 ml of pentane (dried over molecular sieve and gassed with nitrogen) was mixed, and left to react for 5 minutes. One half of the mixture was fed to the reactor and the other half was mixed with 14.2 mg of highly active and stereospecific Ziegler-Natta catalyst (ZN catalyst). The ZN catalyst was produced according to Test Example 3 in EP 591224 (Borealis), and had a Ti content of 2.1 weight percent. After about 10 minutes the ZN catalyst/TEA/Donor D/pentane mixture was supplied to the reactor. The molar ratio of Al/Ti was 250 and the molar ratio of Al/Do was 10. 100 mmol of hydrogen and 1400 g of propylene were fed to the reactor. The lamp was switched on. The lamp was a halogen lamp, 50 watts, 12 volts. Temperature was increased from room temperature to 80° C. over 19 minutes. After 30 minutes at 80° C. the reaction was stopped by letting out unreacted propylene.

The polymer was analyzed and the results are shown in Table 1. The activity was 22.6 kg of propylene per gram of catalyst.

COMPARATIVE EXAMPLE 15

This example was performed according to Example 14 but there was no light treatment during polymerization. Details and results are shown in Table 1. The activity was 19.9 kg of propylene per gram of catalyst.

The example of this patent thus yields an approximately 15 percent higher activity than the comparative example. The table likewise indicates that the light treatment does not have a significant effect on the polymer properties.

|  |  | Example 14 | Comparative Example 15 |
|---|---|---|---|
| Catalyst content | mg | 14.2 | 14.3 |
| Yield | g | 321 | 285 |
| Activity | kgPP/gcat 30 min | 22.6 | 19.9 |
| MFI | g/10 min | 2.2 | 2.6 |
| Xylene-soluble parts | wt % | 1.2 | 1.1 |
| Isotacticity (FTIR) | % | 98.2 | 98.3 |
| Melting point | ° C. | 166.9 | 166.4 |
| Crystallization point | ° C. | 118.8 | 119.4 |
| Crystallinity | % | 51 | 52 |

EXAMPLE 16

Comparison of Polymerization with Light from Halogen Lamp and with Light from Mercury Lamp Polymerization was performed in a 20 ml minireactor with catalyst, produced according to Example 1 in the quantities stated in Table 2, being introduced into the reactor. The reactor was closed and connected to the ethylene source. Ethylene partial pressure was set to 4.5 bars. Polymerization temperature was 80° C. and polymerization time was 60 min. Ethylene consumption was pursued by the drop in pressure, namely in the range between 4980 and 5010 mbar. The reactor, provided with a glass window, was irradiated with a cold light source FLEXILUX 600 longlife with Phillips 14501 DDL, 20V/150 W halogen lamps. The highest light intensity was used. After a reaction time of 60 min polymerization was stopped by closing the ethylene supply and the ethylene pressure was lifted.

The halogen lamp had a very wide spectrum of emitted visible light with wavelengths of 350 to 750 nm. Three light filters transmitting light of three different wavelengths were used. The blue filter transmitted wavelengths between 300 and 480 nm, the green/yellow filter transmitted wavelengths above 400 nm and the red filter transmitted wavelengths above 600 nm. The filtered light has only a fraction of the total intensity of the light source. This must be taken into account when comparing results.

The following Table 2 shows the influence of light wavelength on polymerization activity.

TABLE 2

Effect of light on polymerization activity with halogen lamp:

| Catalyst (mg) | 7.01 | 7.13 | 7.1 | 7.16 |
|---|---|---|---|---|
| Reaction time (min) | 60 | 60 | 60 | 60 |
| HDPE yield (g) | 0.88169 | 1.06657 | 0.7225 | 0.5897 |
| Specific yield (g HDPE/g*cat) | 125.776 | 149.6 | 101.8 | 82.4 |
| Activity(kg HDPE/mole metal × h) | 6340 | 7580 | 5120 | 4180 |
| Wavelength | 350–750 nm (halogen lamp) | 300–480 nm (blue filter) | >400 nm (green filter) | >600 nm (red filter) |

The activity of the catalyst was highest when the filter transmitted light with a wavelength of 300 to 450 nm. Activity dropped when irradiation was performed with a higher wavelength.

When the absorption spectrum of the catalyst n-Bu-Cp$_2$ZrCl$_2$/MAO; Al/Zr=200 mol/mol was compared with the transmitted light, a distinct overlap of absorbed light and transmitted light appeared. It turns out that the highest activity is reached at a radiation frequency corresponding to that of the absorption of the active metallocene/MAO complex. The further away the radiation frequency is from the absorption spectrum of the catalyst, the lower the activation effect is.

FIG. 1 shows the comparison of the absorption spectrum of the metallocene complex (gray area) with the emission ranges of the three filters.

Additional polymerizations were performed as described above in said Example 16 but using, instead of a halogen lamp, a mercury lamp emitting in the range of 300 to 550 nm. In comparison with the halogen lamp, which has a wide emission spectrum, the mercury lamp has a few single, very strong emissions. The result of said polymerizations is presented in Table 3:

TABLE 3

Effect of light on polymerization activity with mercury lamp:

| Catalyst (mg) | 7.07 | 7.03 | 7.18 |
|---|---|---|---|
| Reaction time (min) | 60 | 60 | 60 |
| HDPE yield (g) | 0.98843 | 1.10507 | 0.6768 |
| Specific yield (g HDPE/g*cat) | 139.8 | 157.2 | 94.3 |
| Activity (kg HDPE/(mole metal × h) | 7050 | 7920 | 4750 |
| Wavelength | 300–550 nm (mercury lamp) | 300–480 nm (blue filter) | >600 nm (red filter) |

The invention claimed is:

1. A polymerization process using a coordination catalyst, wherein the coordination catalyst and the monomer are exposed to electromagnetic radiation during the coordination polymerization process, characterized in that ethylene, ethylene and comonomers, propylene, or propylene and comonomers are polymerized in the polymerization process.

2. A process for increasing the productivity of a coordination catalyst in a polymerization process, wherein the coordination catalyst and the monomer are exposed to electromagnetic radiation during the polymerization process.

3. A process according to claim 1, characterized in that the electromagnetic radiation has a wavelength in the range between infrared and ultraviolet.

4. A process according to claim 1, characterized in that the electromagnetic radiation has a wavelength in the range between 800 and 100 nanometers.

5. A process according to claim 1, characterized in that the electromagnetic radiation has a wavelength of the absorption range of the coordination catalyst.

6. A process according to claim 1, characterized in that the electromagnetic radiation has a wavelength in the area of the peak of the absorption spectrum of the coordination catalyst.

7. A process according to claim 1, characterized in that the electromagnetic radiation is applied continuously during the polymerization process.

8. A process according to claim 1, characterized in that the electromagnetic radiation is applied in intervals during the polymerization process.

9. A process according to claim 1, characterized in that the coordination catalyst does not decompose through activation with electromagnetic radiation.

10. A process according to claim 1, characterized in that polymerization takes place without formation of free radicals.

11. A process according to claim 1, characterized in that impurities are present in the polymerization process.

12. A process according to claim 1, characterized in that olefins are polymerized in the polymerization process.

13. A process according to claim 1, characterized in that a Ziegler-Natta catalyst is used as a coordination catalyst.

14. A process according to claim 1, characterized in that a metallocene catalyst is used as a coordination catalyst.

15. A process according to claim 1, characterized in that only coordination catalysts with or without cocatalysts are used.

16. A process according to claim 1, characterized in that a mixture of coordination catalysts is used.

17. A process according to claim 1, characterized in that a coordination catalyst together with a cocatalyst is used.

18. A process according to claim 17, characterized in that alumoxanes are used as a cocatalyst.

19. A process according to claim 17, characterized in that boron catalysts are used as a cocatalyst.

20. A process according to claim 1, characterized in that polymerization is solution polymerization.

21. A process according to claim 1, characterized in that polymerization is slurry polymerization.

22. A process according to claim 1, characterized in that polymerization is gas phase polymerization.

23. A process according to claim 1, characterized in that polymerization is slurry polymerization followed by gas phase polymerization.

24. A process according to claim 1, characterized in that polymerization is supercritical ethylene polymerization.

25. A process according to claim 1, characterized in that polymerization is prepolymerization.

26. A process according to claim 1, characterized in that polymerization is oligomerization.

27. A polymer produced by a coordination polymerization process according to claim 1 using a coordination catalyst, wherein the coordination catalyst and the monomer are exposed to electromagnetic radiation during the polymerization reaction.

28. A coordination polymerization process using an apparatus comprising devices for emitting electromagnetic radiation, wherein the radiation is directed to a coordination catalyst and a monomer.

29. A process according to claim 28, wherein the device for emitting electromagnetic radiation is disposed within a polymerization reactor.

30. A process according to claim 29, wherein the device for emitting electromagnetic radiation is disposed within a feed pipe connected to the polymerization reactor.

31. A process according to claim 29, wherein the device for emitting electromagnetic radiation is disposed outside the polymerization reactor and the wall of the polymerization reactor has a window through which electromagnetic radiation can pass into the reactor.

32. A process according to claim 31, wherein the window is made of glass or quartz.

33. A process according to claim 30, wherein the device for emitting electromagnetic radiation is disposed outside the feed pipe to the polymerization reactor and the feed pipe has a window through which radiation passes into the pipe.

34. A process according to claim 33, wherein the window is made of glass or quartz.

35. A process according to claim 29, wherein the device for emitting electromagnetic radiation is disposed outside the polymerization reactor and electromagnetic radiation can pass into the reactor via a light guide.

36. A process according to claim 30, wherein the device for emitting electromagnetic radiation is disposed outside the feed pipe to the polymerization reactor and electromagnetic radiation can pass into the pipe via a light guide.

37. A process according to claim 28, wherein the device for emitting electromagnetic radiation emits radiation in the range between infrared and ultraviolet.

* * * * *